April 23, 1957     A. S. DAVIS, JR     2,789,914
COMESTIBLE TREATING METHODS
Filed Aug. 14, 1953     2 Sheets-Sheet 1
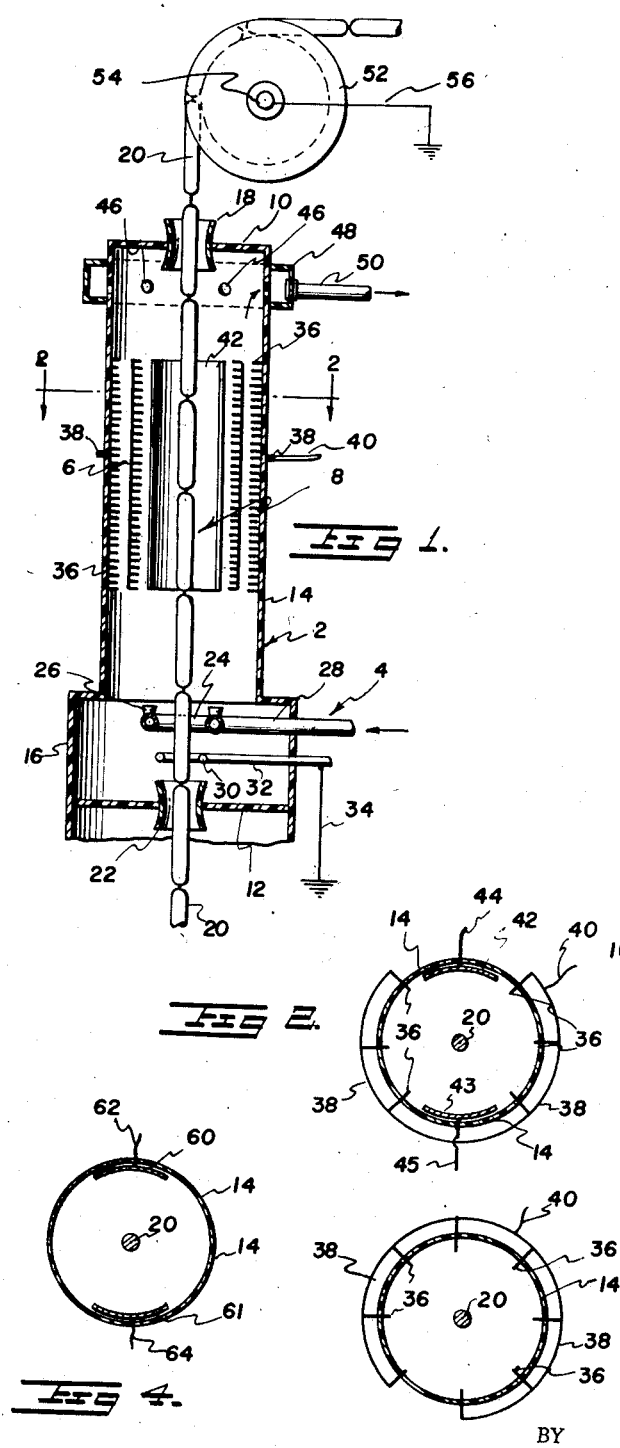
INVENTOR
ALBERT S. DAVIS, JR.
BY *Harold T. Stowell*
ATTORNEY

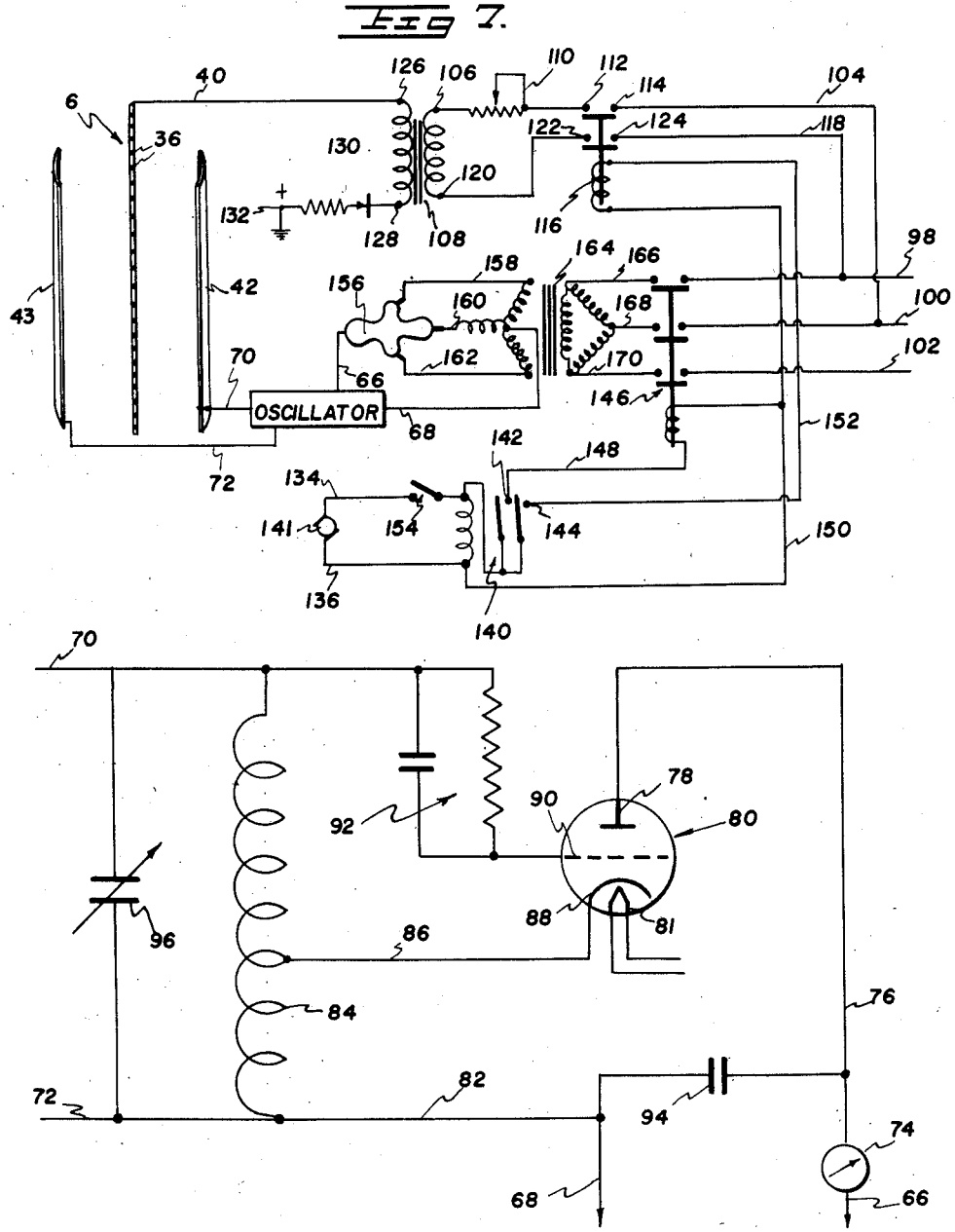

United States Patent Office 2,789,914
Patented Apr. 23, 1957

2,789,914

COMESTIBLE TREATING METHODS

Albert S. Davis, Jr., Somerville, N. J., assignor to Research Corporation, New York, N. Y., a corporation of New York Application August 14, 1953, Serial No. 374,363

3 Claims. (Cl. 99—229)

This invention relates to comestible treating methods. More particularly, it is concerned with the concurrent flavoring and cooking of comestibles, e. g., the smoking and cooking of meat in a single operation, using electrostatic smoke precipitation and high-frequency dielectric heating.

A principal object of this invention is to provide a new method by which comestibles may be cooked and flavored in a single operation. Further objects include:

The provision of new apparatus for the flavoring and cooking of comestibles;

The provision of new meat smoking and cooking methods which reduce the amount of moisture and food values lost by the meat during treatment and which give increased rate and improved uniformity of flavor penetration;

The provision of meat smoking and cooking methods in which moisture for conditioning smoke flavoring substances is supplied in a highly advantageous fashion;

The elimination of handling operations and reduction of time heretofore required for the smoking and cooking of meat; and The provision of meat curing procedures which may be conducted in a continuous fashion, e. g., the continuous smoking and cooking of sausages while the sausages are passed in a string through the novel treating equipment.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

These objects are accomplished according to the present invention by heating a comestible to cooking temperature in a confined zone with high-frequency dielectric heating, passing a gas containing food treating substances suspended therein into said confined zone and electrostatically precipitating the food treating substances from the gas suspension onto the comestible.

Basically the apparatus for carrying out such operations comprises a chamber, means for introducing a gas suspension of food treating substances into said chamber, means for positioning a comestible within said chamber for treatment, high-frequency dielectric heating means within said chamber for heating a comestible and means for electrostatically precipitating food treating substances from a gas suspension thereof onto a comestible within said chamber.

More complete details of both the new methods and apparatus can be had by reference to the accompanying drawings in which:

Fig. 1 is a diagrammatic side sectional elevational view of one form of comestible treating apparatus of the present invention;

Fig. 2 is a vertical sectional view of the apparatus of Fig. 1 taken along the line 2—2 of Fig. 1;

Fig. 3 is a diagrammatic side sectional elevation of another form of apparatus of this invention;

Fig. 4 is a vertical sectional view taken along the line 4—4 of Fig. 3;

Fig. 5 is a vertical sectional view taken along the line 5—5 of Fig. 3;

Fig. 6 is a wiring diagram of one form of high-frequency current generator which may be used to energize the dielectric heating electrodes employed in the apparatus of this invention; and Fig. 7 is a schematic diagram of the electrical hook-up of the high-frequency dielectric heating and electrostatic precipitation circuits and a timing circuit which controls the sequence of energizing each of the circuits.

Referring in detail to Figs. 1 and 3 of the drawings, the treating apparatus comprises a chamber 2, means 4 for passing gas containing food treating substances suspended therein into the chamber 2, electrostatic precipitating means 6 and high-frequency dielectric heating means 8.

The chamber 2 has a top member 10, a bottom member 12 and a side member 14 having an enlarged bottom section 16. These members are preferably all made of non-conducting material, e. g., fabricated laminated plastic sheet stock, although with modification to the electrode suspensions and the like, conductive materials may be used.

A tubular member 18 is fixed in the center top 10 forming an inlet to chamber 2 for the string of sausages 20. A similar tubular member 22 is fixed in the bottom 12 providing the sausage outlet.

The gas introducing means 4 comprises a distribution ring 24 having upwardly extending nozzles 26 and is connected with pipe 28 which passes through the side bottom portion 16 of the chamber 2.

A small metal ring 30 is held between the ring 24 and outlet 22 by the bar 32 which passes through the side portion 16. The bar 32 is wired to ground through conductor 34 so the ring 30 serves both as a guide and a ground connection for the string of sausages 20.

The electrostatic precipitating means 6 comprises a number of vertical series of horizontal pins 36 electrically connected together by the electrical conductor 38. This, in turn, connects to lead 40 to conduct high potential, low-amperage electrical current from a source not shown to the precipitating means 6. The pins 36 create a corona discharge effect in the electrostatic field which exists between the pins 36 and the sausage string 20, thus giving efficient electrostatic precipitation of meat flavoring smoke contained in the chamber 2.

Referring specifically to Figs. 1 and 2, the high-frequency dielectric heating means 8 comprises planosurface electrodes 42 and 43 which are arcuate in shape and which are concentrically aligned with tubular inlet and outlet members 18 and 22. The heating means 8 also includes electric terminals 44 and 45 which conduct high frequency current, e. g., 100 kilocycles to 1000 megacycles as will be explained later in connection with Figs. 6 and 7, to the electrodes 42 and 43.

The top side wall 14 of the chamber 2 has a number of holes 46 drilled or punched therein. Around the outside of the wall 14 adjacent the openings 46 is a manifold ring 48 which connects the openings 46 through a pipe 50 to a gas circulation unit (not shown) for recycle or exhausting of the gas leaving the heating chamber.

Positioning of the sausages for travel through the chamber 2 is accomplished by the guide wheel 52. This is rotated on shaft 54 above top member 10 so that the string of sausages passes directly off the wheel 52 into the inlet member 18. Preferably the wheel 52 and shaft 54 are made of electrically conducting material so they can be grounded through lead 56. This arrangement with the guide ring 30 ensures proper electrical current flow between sausage string 20 and the electrode means 6 and 8.

In the modified form of apparatus shown in Figs. 3 to 5 the general construction of chamber 2 and associated units is the same as in the form of apparatus drawn in Fig. 1. However, apparatus of Fig. 3 uses modified forms of electrostatic precipitating means 6 and dielectric heating means 8.

Referring to Figs. 3 to 5, the electrostatic precipitating electrode pins 36 are located midway between the top 10 and bottom 12 of the chamber 2. Above and below the vertical series of pins 36 are located planosurface dielectric heating electrodes 58, 60 and 61. The electrodes 60 and 61 are connected through terminals 62 and 64 to a high-frequency current generator such as shown in Fig. 6. If desired, lower electrodes 58, and its mate may be connected to one generator and electrodes 60 and 61 to another generator to permit independent operation thereof.

Various forms of high-frequency current generators for energizing the dielectric heating means may be used. A suitable type is a so-called Hartley oscillator such as shown in Fig. 6. In this generator, leads 66 and 68 connect with a direct current source of current (shown in Fig. 7). Leads 70 and 72 connect to the terminals 44 and 45 of the apparatus of Fig. 1 or terminals 62 and 64 of the Fig. 3 apparatus. The lead 66 conducts direct current through the ammeter 74 and line 76 to the plate 78 of the triode tube 80 having cathode heating means 81. Lead 68 connects through line 82, transformer 84 and line 86 to the cathode 88 of tube 80. The grid 90 of the tube connects to the feed back unit 92. A condenser 94 bridges lead 68 to wire 76 and a small trimmer condenser 96 bridges leads 70 and 72 to adjust the circuit to the optimum frequency for dielectric heating of any given comestible.

The hook-up of the high-frequency oscillator and other circuit components can be seen in Fig. 7. Leads 98, 100 and 102 connect to a three phase alternating current source, e. g., 440 volts, 60 cycles (not shown). Wire 104 connects terminal 106 of the primary winding of the high potential transformer 108 to line 98 through rheostat 110 and contacts 112 and 114 of single throw double pole solenoid switch 116. Likewise wire 118 connects the other terminal 126 through contacts 122 and 124 of switch 116 to line 100 energizing the transformer 108 with single phase alternating current.

Terminal 126 of the secondary windings of transformer 108 connects directly through lead 40 to the electrostatic precipitator means 6 and the electrode pins 36. The terminal 128 is wired through the kenotron or dry-plate rectifier 130 to ground connection 132.

Leads 134 and 136 connect switch assembly 140 to a source 141 of alternating current, e. g., 100 volts, 60 cycles. The switch 140 is of the motor driven timed variety having contacts 142 and 144 which are closed and opened alternately. Contact 142 connects the operating solenoid of switch 146 through lines 148 and 150 to the alternating current source 141. Similarly, contact 144 connects the solenoid operator of switch 116 through lines 150 and 152 to the alternating current source 141.

A single throw, single pole switch 154 serves to turn on or off the entire apparatus. Thus, switches 116, 140 and 146 are the normally open type and until the solenoids of these switches are energized by current from source 141, the electrode assemblies receive no consent.

Direct current for the oscillator, as in Fig. 6, is obtained from the three-phase mercury arc rectifier 156 which connects through leads 158, 160 and 162 to the secondary of three-phase transformer 164. In turn, the primary of transformer 164 connects through leads 166, 168 and 170 and corresponding contacts in triple pole, single throw switch 146 to leads 98, 100 and 102, respectively.

The operation of the new apparatus of this invention is as follows. A comestible (sausage strings in the case illustrated in the drawings) is run over guide wheel 52, through opening 18 into chamber 2. The switch to the motor running drive 52 may be switch 154 so that all units of the apparatus turn on and off together or a separate switch may be used so comestible positioning means 52 may be operated independently of the other electric circuits.

The chamber 2 is filled with meat flavoring smoke through the pipe 28 and distributor ring 24. With switch 154 closed, time controlled switch 140 will alternately energize switches 116 and 146. The duration of energizing of the separate switches need not be identical, and in fact, is preferably different. Hence, switch 140 should be of the type which permits the time cycle of operation for contacts 142 and 144 to be varied.

As the string of sausages passes down the chamber 2, the sausages 20 will be heated dielectrically by the high-frequency field formed between electrodes 42 and 43 or 60 and 61, as the case may be. The high-frequency dielectric heating quickly brings the sausage links up to cooking temperature so that valuable moisture and food values are not lost. At the same time, this type of heating has been found to condition the comestible to permit the flavoring smoke to penetrate rapidly and uniformly into the food product.

When contact 142 opens and 144 closes, the high-frequency dielectric heating current is cut-off and the high potential electrostatic charge is impressed upon corona discharge pins 36 by transformer 108. This causes food flavoring substances to be precipitated from the smoke in chamber 2 onto the comestible. The speed of movement of the comestible through the treating chamber is controlled according to texture, size, and the like of the comestible so that upon leaving the apparatus through exit 22, the comestible is fully cooked and smoked.

The dielectric heating of the comestible and electrostatic precipitation of smoke may be carried out continuously or discontinuously. Also, the heating and precipitation may be done simultaneously or intermittently. However, intermittent, discontinuous application of heat and smoke precipitation is preferred since this has been discovered to permit control of the smoke flavor. Most meat flavoring smokes and other gas suspensions of food treating substances contain components of different chemical properties and flavors. Usually the rate of electrical charging of these components varies so their precipitation onto the comestible can be controlled by controlling the length of time the electrostatic precipitator is energized. This is true whether the curing treatment is carried out continuously, as with the apparatus of the drawing, or by batch process.

Batch type operation is preferred for large food products, such as hams or the like, and is best conducted in rectangular chambers or rooms equipped with holding racks and the like in place of the wheel type positioning means 52 of the drawings.

New apparatus and methods have been described for treating comestibles such as the smoking and cooking of meats. These are generally applicable to all types of meats or other food products and the exact forms of apparatus used may be altered in structural details to accommodate comestibles of all sizes and shapes. Meats of the sausage link type, e. g., "hot-dogs," and similar continuous meat products can be cured continuously. However, the methods and apparatus can be used with success in batch operations.

I claim:

1. A method of treating food products by subjecting said products to the combined action of two electrical energy fields to bring about uniform internal heating and penetration thereinto of an externally applied flavoring smoke with a minimum loss of moisture and food values from said products, which comprises subjecting said products while in a confined zone to a high frequency dielectric field effective to generate heat in said products and to a high voltage electrical precipitating field terminating on said products while introducing into the confined zone a food flavoring smoke.

2. A method of treating food products by subjecting said products to the combined action of two electrical energy fields to bring about uniform internal heating and penetration thereinto of an externally applied flavoring smoke with a minimum loss of moisture and food values from said products, which comprises passing said products through a confined zone, subjecting said products while in a confined zone to a high frequency dielectric field effective to generate heat in said products and to a high voltage electrical precipitating field terminating on said products while introducing to flow through the confined zone a food flavoring smoke.

3. A method of treating food products by subjecting said products to the combined action of two electrical energy fields to bring about uniform internal heating and penetration thereinto of an externally applied flavoring smoke with a minimum loss of moisture and food values from said products, which comprises passing said products through a confined zone, subjecting said products while in a confined zone to a dielectric field effective to generate heat in said products having a frequency of from about 100 kilocycles per second to about 1000 megacycles per second and to a high voltage electrical precipitating field terminating on said products while introducing to flow through the confined zone a food flavoring smoke.

References Cited in the file of this patent

UNITED STATES PATENTS

| | | |
|---|---|---|
| 2,138,813 | Bemis | Dec. 6, 1938 |
| 2,140,163 | McKee | Dec. 13, 1938 |
| 2,413,003 | Sherman | Dec. 24, 1946 |
| 2,421,787 | Helmuth | June 10, 1947 |
| 2,428,991 | Ramsburg | Oct. 14, 1947 |
| 2,454,370 | Beaubien | Nov. 23, 1948 |
| 2,565,454 | MacKenzie et al. | Aug. 21, 1951 |
| 2,585,799 | Lawrence | Feb. 12, 1952 |
| 2,623,451 | Prohaska | Dec. 30, 1952 |

FOREIGN PATENTS

| | | |
|---|---|---|
| 679,751 | Great Britain | Sept. 24, 1952 |